UNITED STATES PATENT OFFICE.

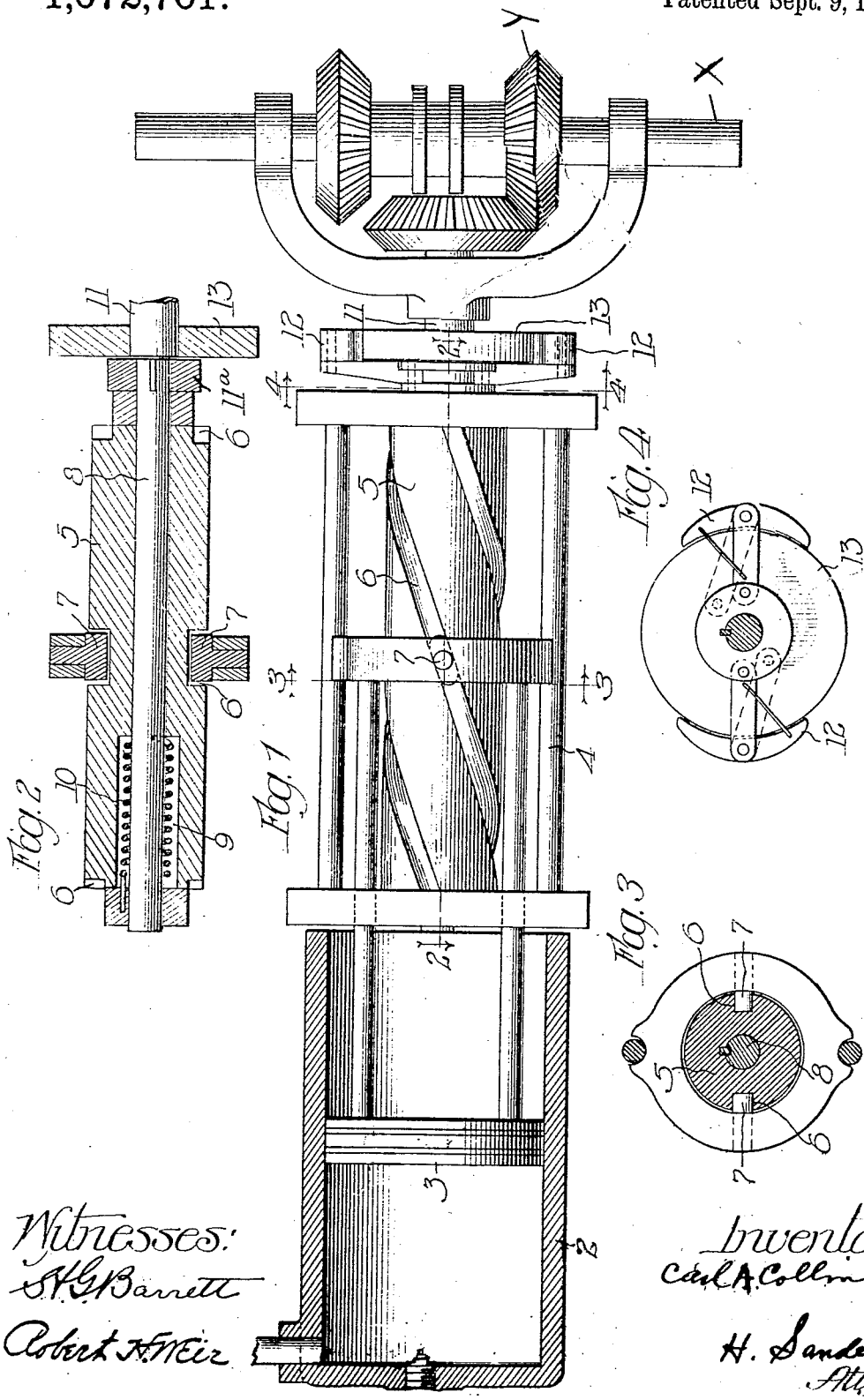

CARL ALFRED COLLINS, OF BROCKTON, MASSACHUSETTS.

ENGINE.

1,072,701. Specification of Letters Patent. Patented Sept. 9, 1913.

Application filed February 14, 1910, Serial No. 543,657. Renewed February 24, 1913. Serial No. 750,412.

*To all whom it may concern:*

Be it known that I, CARL ALFRED COLLINS, a subject of the King of Sweden, residing at Brockton, in the county of Plymouth and State of Massachusetts, have invented certain new and useful Improvements in Engines, of which the following is a specification.

This invention relates to engine operated by the explosion of gas, combustible vapor, etc., its object being the production of such a machine that is capable of great speed.

Another object is the evolution of a device whereby one stroke of the piston will cause more than one complete revolution of the shaft.

With this and other objects in view the invention consists in the construction and combination of parts to be hereinafter fully described in the following specifications, pointed out in the claim and illustrated in the drawings, in which—

Figure 1 is a side elevation of the device showing the cylinder in section. Fig. 2 is a longitudinal cross section on line 2—2 of Fig. 1 showing the spring employed. Fig. 3 is a section on line 3—3 of Fig. 1. Fig. 4 is a detail of the clutch employed.

Like reference characters indicate corresponding parts throughout the several views.

2 is the engine cylinder in which the piston 3 operates, the exterior head of which is hollow and operates in a guide frame 4 residing adjacent the open extremity of the engine cylinder and in alinement therewith.

5 is the engine shaft arranged in suitable bearings in the guide 4 and having a spiral groove 6 running around it.

7 is a shoe secured in the hollow piston head (there are two shoes 7 arranged diametrically opposite each other) and adapted to travel in the groove 6 of the shaft 5.

Shaft 5 is hollow throughout its length and embraces a round shaft 8 to which it is keyed as shown in Fig. 3. Near one extremity of shaft 5 its central longitudinal cavity is enlarged as at 9 to accommodate a spiral spring 10 one end of which is secured to the inner shaft 8 and the opposite end to the guide 4 as shown in Fig. 2. An explosion in the cylinder forces the piston outwardly causing the shoes 7 to travel forward in the groove 6 of shaft 5 thus rotating said shaft with the inner shaft rapidly to the right and tending to wind the spring 10 upon said inner shaft. When the piston begins its return movement the shaft 5 is reversed and the spring 10 assists in the work of reversing this shaft, it thus also assists the piston in making the return stroke.

11 is a shaft independent of the mechanism so far described which is provided with a wheel 13 and clutch 12 on one extremity adjacent the guide 4 and which may convey power to a transmission shaft X through the medium of bevel gears Y carried by the two shafts as shown.

11ª is a disk keyed to inner shaft 8 and capable of engagement with clutch 12 when revolved to the right but free from the same when revolved in the opposite direction. This arrangement enables the piston to transmit power to shaft 11 on every outward stroke.

With my arrangement the number of revolutions imparted to the shaft by an explosion depends upon the force of that explosion coupled with the length of the groove in said shaft and it matters not at what position on the shaft the outer cylinder head may have at the time of an explosion, power is conveyed to shaft 11.

What I claim is:—

The combination of, a member 2, a reciprocating member having its exterior head hollow working in said member 2, a shoe carried in said hollow head, a guide 4 in alinement with the aforesaid member 2 adapted to surround and embrace the hollow head, a hollow spirally grooved shaft having its cavity enlarged at one extremity running longitudinally of said guide and adapted to engage said shoe, an inner shaft keyed to said hollow shaft, a disk keyed to said inner shaft, a clutch 12 engaged thereby and a spiral spring within the before-mentioned enlarged cavity of the hollow shaft having one extremity secured to the inner shaft while the opposite is secured to the guide.

In testimony that I claim the foregoing as my own I have hereto affixed my signature in the presence of two subscribing witnesses.

CARL ALFRED COLLINS.

Witnesses:
  CARL MAGNUS PETERSON,
  KLAS ALFRED ROHMAN.

Copies of this patent may be obtained for five cents each, by addressing the "Commissioner of Patents, Washington, D. C."